(12) United States Patent
Chen et al.

(10) Patent No.: US 9,701,859 B2
(45) Date of Patent: Jul. 11, 2017

(54) POLYMERIC COMPOSITIONS WITH SILICONE AND FATTY ACID AMIDE SLIP AGENT

(71) Applicant: Dow Global Technologies LLC, Midland, MI (US)

(72) Inventors: Buo Chen, Hillsborough, NJ (US); Mohamed Esseghir, Collegeville, PA (US); Jeffrey M. Cogen, Flemington, NJ (US); Chester J. Kmiec, Phillipsburg, NJ (US); Anny L. Flory, Philadelphia, PA (US); Saswati Pujari, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 2 days.

(21) Appl. No.: 14/764,230

(22) PCT Filed: Apr. 3, 2014

(86) PCT No.: PCT/US2014/032773
§ 371 (c)(1),
(2) Date: Jul. 29, 2015

(87) PCT Pub. No.: WO2014/172105
PCT Pub. Date: Oct. 23, 2014

(65) Prior Publication Data
US 2016/0060476 A1 Mar. 3, 2016

Related U.S. Application Data

(60) Provisional application No. 61/812,754, filed on Apr. 17, 2013.

(51) Int. Cl.
*H01B 3/30* (2006.01)
*C09D 123/06* (2006.01)
*G02B 6/44* (2006.01)
*H01B 3/44* (2006.01)
*C08K 5/20* (2006.01)

(52) U.S. Cl.
CPC .......... *C09D 123/06* (2013.01); *G02B 6/443* (2013.01); *H01B 3/301* (2013.01); *H01B 3/441* (2013.01); *C08K 5/20* (2013.01); *G02B 6/4464* (2013.01)

(58) Field of Classification Search
CPC B29C 71/04; B29K 2105/24; B29K 2023/06; B29K 2023/083; B29K 2023/065; B29K 2023/086; B29K 2023/0625; B29K 2023/0633; B29K 2023/0691; B29L 2023/005; B32B 1/08; B32B 37/00; C08F 255/02; C08K 5/01; C08K 5/20; C08K 5/0016; C08L 23/04; C08L 23/06; C08L 23/10; C08L 23/18; C08L 23/0815; C08L 23/0869; C08L 23/0876; C08L 23/0884; C08L 23/0892; C08L 2312/08; C08L 51/06; C09D 123/06; F16L 9/12; F16L 11/06; G02B 6/443; G02B 6/4438; G02B 6/4464; G02B 6/4485; H01B 3/301; H01B 3/441
USPC .................. 174/110 SR; 264/211, 470, 236; 428/36.9; 525/192, 240
See application file for complete search history.

(56) References Cited

U.S. PATENT DOCUMENTS

| | | |
|---|---|---|
| 3,852,875 A | 12/1974 | McAmis et al. |
| 4,356,139 A | 10/1982 | Rowland et al. |
| 4,605,818 A | 8/1986 | Arroyo et al. |
| 4,761,233 A * | 8/1988 | Linder ............... B01D 67/0011 210/500.37 |
| 4,952,021 A | 8/1990 | Aoki et al. |
| 5,074,640 A | 12/1991 | Hardin et al. |
| 5,252,676 A | 10/1993 | Suyama et al. |
| 5,660,932 A | 8/1997 | Durston |
| 6,080,489 A | 6/2000 | Mehta |
| 6,374,023 B1 | 4/2002 | Parris |
| 6,540,792 B1 * | 4/2003 | Ishii ....................... D06M 11/36 427/2.31 |
| 6,903,264 B2 | 6/2005 | Watanabe et al. |
| 6,912,347 B2 | 6/2005 | Rossi et al. |
| 6,977,280 B2 | 12/2005 | Lee et al. |
| 7,411,129 B2 | 8/2008 | Kummer et al. |
| 8,883,917 B1 * | 11/2014 | Davies .................... C08K 3/36 524/492 |
| 8,986,586 B2 | 3/2015 | Sasse et al. |
| 2003/0199911 A1 | 10/2003 | Boecker et al. |
| 2004/0070154 A1 * | 4/2004 | Casey .................... B65H 49/08 277/602 |
| 2004/0254299 A1 | 12/2004 | Lee et al. |

(Continued)

FOREIGN PATENT DOCUMENTS

| | | |
|---|---|---|
| FR | 2857491 A1 | 1/2005 |
| GB | 2409908 A | 7/2005 |

OTHER PUBLICATIONS

International Search Report and Written Opinion of the Internatinal Searching Authority for PCT/US2014/032773, 2014, pp. 1-7.

(Continued)

*Primary Examiner* — Timothy Thompson
*Assistant Examiner* — Guillermo Egoavil

(57) ABSTRACT

Polymeric compositions having a slip agent comprising a silicone and a fatty acid amide. Such polymeric compositions can exhibit lower coefficients of friction when compared to polymeric compositions containing either silicone or fatty acid amide alone. Such polymeric compositions are suitable for use in various articles of manufacture, including, for example, wire and cable jackets.

9 Claims, No Drawings

(56) References Cited

U.S. PATENT DOCUMENTS

| | | |
|---|---|---|
| 2005/0238300 A1 | 10/2005 | Jamet et al. |
| 2006/0088657 A1 | 4/2006 | Reece et al. |
| 2006/0199911 A1* | 9/2006 | Markovich ......... C08L 23/0815 525/192 |
| 2008/0317990 A1* | 12/2008 | Runyan .................. C08L 23/06 428/36.9 |
| 2010/0236811 A1 | 9/2010 | Sasse et al. |
| 2011/0213085 A1 | 9/2011 | Tonelli et al. |
| 2011/0262085 A1 | 10/2011 | Takeda et al. |

OTHER PUBLICATIONS

International Preliminary Report on Patentability for PCT/US2014/032773, 2015, pp. 1-5.

\* cited by examiner

POLYMERIC COMPOSITIONS WITH SILICONE AND FATTY ACID AMIDE SLIP AGENT

REFERENCE TO RELATED APPLICATIONS

The present application claims the benefit of U.S. Provisional Application No. 61/812,754, filed on Apr. 17, 2013.

FIELD

Various embodiments of the present invention relate to cable jacket polymeric compositions having a slip agent comprising a silicone and a fatty acid amide.

INTRODUCTION

Friction between cable-jacket compounds and materials used to make cable ducts limits the lengths of cables that can easily be pulled or air blown through ducts during cable installation. In particular, cable jackets prepared using an ethylene-based polymer can present difficulties during cable installation due to friction with other cables within the duct or the duct material itself. Although slip agents have been developed in an attempt to address this problem, advancements are still desired.

SUMMARY

One embodiment is a cable jacket polymeric composition, comprising:
(a) an ethylene-based polymer; and
(b) a slip agent,
wherein said slip agent comprises a silicone and a fatty acid amide,
wherein said silicone and said fatty acid amide are present in a combined amount ranging from 0.35 to 3.0 weight percent based on the total weight of components (a) and (b).

DETAILED DESCRIPTION

Various embodiments of the present invention concern polymeric compositions comprising an ethylene-based polymer and a slip agent, where the slip agent comprises a silicone and a fatty acid amide. Such polymeric compositions can be suitable for use in coating compositions for preparing wire and cable coatings, such as a cable jacket.

Ethylene-based Polymer

As noted above, one component of the polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. The α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3 cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In an embodiment, the ethylene-based polymer can be a low-density polyethylene ("LDPE"). LDPEs are generally highly branched ethylene homopolymers, and can be prepared via high pressure processes (i.e., HP-LDPE). LDPEs suitable for use herein can have a density ranging from 0.91 to 0.94 g/cm$^3$. In various embodiments, the ethylene-based polymer is a high-pressure LDPE having a density of at least 0.915 g/cm$^3$, but less than 0.94 g/cm$^3$, or less than 0.93 g/cm$^3$. Polymer densities provided herein are determined according to ASTM International ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an $I_2$ of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

In an embodiment, the ethylene-based polymer can be a linear-low-density polyethylene ("LLDPE"). LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as one or more of those α-olefin monomers described above. LLDPEs suitable for use herein can have a density ranging from 0.916 to 0.925 g/cm$^3$. LLDPEs suitable for use herein can have a melt index ($I_2$) ranging from 1 to 20 g/10 min., or from 3 to 8 g/10 min.

In an embodiment, the ethylene-based polymer can be a very-low-density polyethylene ("VLDPE"). VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm³. VLDPEs suitable for use herein can have a melt index ($I_2$) ranging from 0.1 to 20 g/10 min., or from 0.3 to 5 g/10 min.

In an embodiment, the ethylene-based polymer can be a medium-density polyethylene ("MDPE"). MDPEs are ethylene-based polymers having densities generally ranging from 0.930 to 0.945 g/cm³. In an embodiment, the MDPE has a density ranging from 0.939 to 0.943 g/cm³. The MDPE can have a melt index ($I_2$) ranging from 0.1 to 5 g/10 min., from 0.5 to 1.0 g/10 min., or from 0.6 to 0.8 g/10 min.

In an embodiment, the ethylene-based polymer can be a high-density polyethylene ("HDPE"). HDPEs are ethylene-based polymers having densities greater than 0.940 g/cm³. In an embodiment, the HDPE has a density from 0.945 to 0.97 g/cm³, as determined according to ASTM D-792. The HDPE can have a peak melting temperature of at least 130° C., or from 132 to 134° C. The HDPE can have a melt index ($I_2$) ranging from 0.1 g/10 min., or 0.2 g/10 min., or 0.3 g/10 min., or 0.4 g/10 min., up to 5.0 g/10 min., or 4.0 g/10 min., or, 3.0 g/10 min., or 2.0 g/10 min., or 1.0 g/10 min., or 0.5 g/10 min. Also, the HDPE can have a PDI in the range of from 1.0 to 30.0, or in the range of from 2.0 to 15.0, as determined by gel permeation chromatography.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from 10-12:1 to 10 1:1, or from 10-9:1 to 10-5:1.

Examples of suitable commercially available ethylene-based polymers include, but are not limited to, DGDA-6318 BK, DHDA-6548 BK, DHDA-8864 BK, and DFDG-6059 BK, all available from The Dow Chemical Company, Midland, Mich., USA.

In an embodiment, the ethylene-based polymer can be present in the polymeric composition in an amount ranging from 50 to 99.9 wt %, from 75 to 99.8 wt %, or from 97 to 99.65 wt %, based on the total polymeric composition weight. In an embodiment, the ethylene-based polymer can be present in the polymeric composition in an amount ranging from 97 to 99.65 wt %, from 97.5 to 99.5 wt %, from 98.0 to 99.0 wt %, or from 98.25 to 98.75 wt %, based on combined weight of the above-mentioned slip agent and the ethylene-based polymer.

Slip Agent

As noted above, the polymeric compositions described herein further comprise a slip agent. The slip agent employed comprises a silicone and a fatty acid amide.

As used herein, "silicone" denotes a polymer generally comprising siloxane-based monomer residue repeating units. As used herein, "siloxane" denotes a monomer residue repeat unit having the structure:

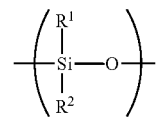

where $R^1$ and $R^2$ are independently hydrogen or a hydrocarbyl moiety. The silicone may also comprise branch points such as

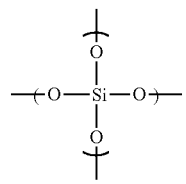

which is known as a "Q" group in silicone chemistry, or

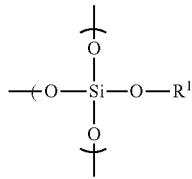

which is known as "T" group in silicone chemistry.

As used herein, the term "hydrocarbyl" denotes a univalent group formed by removing a hydrogen atom from a hydrocarbon (e.g., alkyl groups, such as ethyl, or aryl groups, such as phenyl). In one or more embodiments, the siloxane monomer residue can be any dialkyl, diaryl, dialkaryl, or diaralkyl siloxane, having the same or differing alkyl, aryl, alkaryl, or aralkyl moieties. In an embodiment, each of $R^1$ and $R^2$ is independently a $C_1$ to $C_{20}$, $C_1$ to $C_{12}$, or $C_1$ to $C_6$ alkyl, aryl, alkaryl, or aralkyl moiety. In various embodiments, $R^1$ and $R^2$ can have the same or a different number of carbon atoms. In various embodiments, the hydrocarbyl group for each of $R^1$ and $R^2$ is an alkyl group that is saturated and optionally straight-chain. Additionally, the alkyl group in such embodiments can be the same for each of $R^1$ and $R^2$. Non-limiting examples of alkyl groups suitable for use in $R^1$ and $R^2$ include methyl, ethyl, 1-propyl, 2-propyl, 1-butyl, isobutyl, t-butyl, or combinations of two or more thereof.

Furthermore, the silicone employed herein can have a density in the range of from 0.9 to 1 g/mL, or from 0.95 to 0.98 g/mL, as 25° C. Moreover, the silicone employed herein can have a kinematic viscosity at 25° C. in the range of from 10×10⁶ to 50×10⁶ centistokes ("cSt"). Viscosity of the silicone is determined herein according to ASTM D445.

In various embodiments, the silicone can be selected from the group consisting of polydimethylsiloxane ("PDMS"), poly(ethyl-methylsiloxane), and mixtures thereof. Additionally, the silicone can be a mixture of two or more types of silicone. In certain embodiments, the silicone is PDMS. Additionally, the silicone can contain various terminating groups, such as vinyl and/or hydroxyl groups. In one or more embodiments, the silicone is hydroxyl terminated. In an embodiment, the silicone is a hydroxyl-terminated PDMS.

An example of a suitable commercially available silicone includes, but is not limited to, MB50-314, which is a 50:50 masterbatch of an ultra-high molecular weight hydroxyl-terminated polydimethylsiloxane in an HDPE polymer, available from Dow Corning Corporation, Midland, Mich., USA.

In other embodiments, the silicone may be present in the form of an olefin/silicone copolymer. A commercially available example of an olefin/silicone copolymer includes, but is not limited to, EXFOLA™, available from Mitsui Fine Chemicals, Inc., Tokyo, JP.

As noted above, the slip agent further comprises a fatty acid amide. "Fatty acid amide" denotes a molecule having the structure:

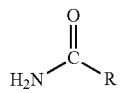

where R is a $C_3$ to $C_{27}$ alkyl moiety. In various embodiments, R can be a $C_{11}$ to $C_{25}$, or a $C_{15}$ to $C_{23}$ alkyl moiety. In an embodiment, R is a $C_{21}$ alkyl moiety. In any such embodiments, R can be saturated, mono-unsaturated, or poly-unsaturated. In an embodiment, R is mono-unsaturated. Specific examples of fatty acid amides suitable for use include, but are not limited to erucamide, oleamide, palmitamide, stearamide, and behenamide. Additionally, the fatty acid amide can be a mixture of two or more fatty acid amides. In an embodiment, the fatty acid amide is erucamide.

In an embodiment, the silicone and fatty acid amide are present in a combined amount ranging from 0.35 to 3.0 wt %, from 0.5 to 2.5 wt %, from 0.75 to 2.0 wt %, or from 1.0 to 1.5 wt % based on the total weight of the slip agent and the ethylene-based polymer. Additionally, the silicone and fatty acid amide can be present in a weight ratio ranging from 1:25 to 2:1, from 1:20 to 2:3, or from 1:6 to 1:2, fatty acid amide-to-silicone. In various embodiments, the silicone can be present in an individual amount ranging from 0.25 to 2.9 wt %, or from 0.25 to 2.0 wt %, based on the total weight of the slip agent and ethylene-based polymer. Furthermore, the fatty acid amide can be present in an individual amount ranging from 0.1 to 1.5 wt %, from 0.1 to 1.0 wt %, or from 0.1 to 0.5 wt %, based on the total weight of the slip agent and ethylene-based polymer.

Additional slip agent components may optionally be included with the silicone and fatty acid amide. Such optional slip agent components include, but are not limited to, plasticizers, organic amines, dibasic esters, stearates, sulfates, fatty acids, mineral oils, vegetable oils, and mixtures of two or more thereof. Such additional slip agent components can be present in amounts up to 50 wt %, up to 25 wt %, up to 15 wt %, up to 10 wt %, or up to 5 wt %, based on the total weight of the slip agent. In an embodiment, the slip agent contains no or substantially no (e.g., less than 10 parts per million by weight) other slip agent components. Thus, in certain embodiments, the slip agent consists essentially of the above-described silicone and fatty acid amide. In other various embodiments, the slip agent consists of the above-described silicone and fatty acid amide.

Additives

The polymeric composition can optionally contain a non-conductive carbon black commonly used in cable jackets. The carbon black component can be compounded with the ethylene-based polymer and slip agent, as described above, either neat or as part of a pre-mixed masterbatch. In various embodiments, the amount of a carbon black in the composition can be greater than zero (>0), typically from 1, more typically from 2, up to 3, wt %, based on the total weight of the polymeric composition. Non-limiting examples of conventional carbon blacks include the grades described by ASTM N550, N472, N351, N110 and N660, Ketjen blacks, furnace blacks, and acetylene blacks. Other non-limiting examples of suitable carbon blacks include those sold under the trade names CSX®, ELFTEX®, MOGUL®, MONARCH®, and REGAL®, available from Cabot.

The polymeric composition can optionally contain one or more additional additives, which are generally added in conventional amounts, either neat or as part of a masterbatch. Such additives include, but are not limited to, flame retardants, processing aids, nucleating agents, foaming agents, crosslinking agents, fillers, pigments or colorants, coupling agents, antioxidants, ultraviolet stabilizers (including UV absorbers), tackifiers, scorch inhibitors, antistatic agents, plasticizers, lubricants, viscosity control agents, anti-blocking agents, surfactants, extender oils, acid scavengers, metal deactivators, vulcanizing agents, and the like.

Non-limiting examples of flame retardants include, but are not limited to, aluminum hydroxide and magnesium hydroxide.

Non-limiting examples of processing aids include, but are not limited to, polyethylene wax, oxidized polyethylene wax, polymers of ethylene oxide, copolymers of ethylene oxide and propylene oxide, vegetable waxes, petroleum waxes, non-ionic surfactants, and fluoroelastomers such as VITON®, available from Dupont Performance Elastomers LLC, or DYNAMAR™, available from Dyneon LLC.

A non-limiting example of a nucleating agent includes, but is not limited to, HYPERFORM® HPN-20E (1,2 cyclohexanedicarboxylic acid calcium salt with zinc stearate) from Milliken Chemicals, Spartanburg, S.C.

Non-limiting examples of fillers include, but are not limited to, clays, precipitated silica and silicates, fumed silica, metal sulfides and sulfates such as molybdenum disulfide and barium sulfate, metal borates such as barium borate and zinc borate, metal anhydrides such as aluminum anhydride, ground minerals, and elastomeric polymers such as ethylene-propylene-diene monomer rubber ("EPDM") and ethylene-propylene rubber ("EPR"). If present, fillers are generally added in conventional amounts, e.g., from 5 wt % or less to 50 wt % or more based on the total weight of the polymeric composition.

Compounding

The polymeric composition described above can be produced by any suitable method. For example, the slip agent, and any optional additives (e.g., carbon black, fillers, etc.) can be added to a melt containing the ethylene-based polymer. Compounding of the components can be performed by blending, for example, using an internal batch mixer such as a Banbury or Bolling internal mixer. Alternatively, continuous single or twin screw mixers can be used, such as a Farrel continuous mixer, a Werner and Pfleiderer twin screw mixer, or a Buss kneading continuous extruder.

The slip agent and optional additives can be introduced into the ethylene-based polymeric composition alone (neat) or as a pre-mixed masterbatch. Such masterbatches are commonly formed by dispersing the slip agent and optional additives into an inert plastic resin, such as polyethylene. Masterbatches are conveniently formed by melt compounding methods.

Polymeric Composition

The resulting polymeric composition, which can be employed to form a cable jacket, can have a low coefficient of friction. "Jacket" denotes the outer-most coating or layer of a cable or other type of coated conductor. In an embodiment, the polymeric composition has a coefficient of friction of 0.15 or less, or less than 0.15, less than 0.14, or less than 0.13. Coefficient of friction is determined according to ASTM D1894. The substrate employed for coefficient of friction determinations is DOW HDPE DGDB-2480 NT, which is a high-density polyethylene commercially available from The Dow Chemical Company, Midland, Mich., USA. In various embodiments, the polymeric composition can have a coefficient of friction ranging from 0.08 to 0.15, from 0.09 to 0.15, or from 0.10 to 0.15.

Though not wishing to be bound by theory, the inventors on the present application have discovered a surprising and synergistic effect when employing a silicone and a fatty acid amide in combination as a slip agent. Particularly, the combination of a silicone and a fatty acid amide provide a polymeric composition having a lower coefficient of friction than when using either the silicone or fatty acid amide as the sole slip agent, even when the total amount of slip agent in the polymeric composition is held constant. Accordingly, in various embodiments, the polymeric composition can have a coefficient of friction lower than both a first comparative composition and a second comparative composition, where the first comparative composition has an identical composition as the polymeric composition except that the slip agent is comprised entirely of silicone, where the second comparative composition has an identical composition as the polymeric composition except that the slip agent is comprised entirely of the fatty acid amide, and the total amount of slip agent in each of the polymeric composition, the first comparative composition, and the second comparative composition is the same.

Articles of Manufacture

In an embodiment, the polymeric composition of this invention can be applied to a cable, a wire, or a conductor as a sheath or insulation layer in known amounts and by known methods, for example, with the equipment and methods described in U.S. Pat. Nos. 5,246,783, 6,714,707, 6,496,629 and USPA 2006/0045439. Typically, the polymeric composition is prepared in a reactor-extruder equipped with a cable-coating die and, after the components of the composition are formulated, the composition is extruded over the cable or conductor as the cable or conductor is drawn through the die. Cure may begin in the reactor-extruder.

Other articles of manufacture that can be prepared from the polymer compositions of this invention include fibers, ribbons, sheets, tapes, tubes, pipes, weather-stripping, seals, gaskets, hoses, foams, footwear bellows, bottles, and films. These articles can be manufactured using known equipment and techniques.

Definitions

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

"Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Residue," when referring to a monomer, means that portion of a monomer molecule which resides in a polymer molecule as a result of being polymerized with another monomer or comonomer molecule to make the polymer molecule.

Test Methods

Coefficient of Friction

Coefficient of friction ("COF") is measured according to ASTM D1894 using a tribometer. The substrate against which the COF of the samples is measured is a high-density polyethylene available under the trade name DGDB-2480 NT, produced by The Dow Chemical Company, Midland, Mich., USA. For each sample, a new substrate is used, and the tests are repeated for 40 cycles to demonstrate the effect of surface wear on the COF. The data reported in the Tables below is the value obtained on the $40^{th}$ cycle.

EXAMPLES

Example 1

Synergism of Combined Erucamide and PDMS Slip Agents

Prepare six Samples (S1-S6) by combining erucamide and hydroxyl-terminated polydimethylsiloxane ("OH-PDMS") slip agents in high-density polyethylene ("HDPE") according to the compositions shown in Table 1, below. The erucamide employed is CRODAMIDE™ ER, available from Croda International Plc, Snaith, UK. The OH-PDMS employed is present as a masterbatch containing 50 wt % OH-PDMS and 50 wt % HDPE, available under the product name MB50-314 from Dow Corning Corporation, Midland, Mich., USA. The HDPE employed is available under the product name DGDA-6318 BK from The Dow Chemical Company, Midland, Mich., USA. To prepare the Samples, first combine the erucamide with the HDPE in a suitable container, followed by addition of the OH-PDMS masterbatch. Thereafter, mix the materials in a Brabender mixer at 175° C. and 15 rpm for 20 minutes. The mixture is then removed and immediately pressed into plaques of 10-mil thickness at 180° C. and 500 psi for 5 minutes, 2,500 psi for 5 minutes, and then slow-cooled at 10° C./minute.

For each of the Samples S1-S6 prepared, prepare two corresponding Comparative Samples (CS1 A & B to CS6 A & B) using the same preparation method, except each Comparative Sample respectively contains only one of either erucamide or OH-PDMS. In each case, the total amount of slip agent in each Comparative Sample should be the same as the total amount of slip agent in its corresponding Sample.

Measure the coefficient of friction ("COF") of each Sample and Comparative Sample according to the Test Methods provided above. The results are provided in Table 1, below.

TABLE 1

Compositions and COF of S1-S6 and CS1A & B-CS6A & B

| Sample No. | HDPE (wt %) | MB50-314* (wt %) | Erucamide (wt %) | Total slip agent (wt %) | COF |
|---|---|---|---|---|---|
| S1 | 99.4 | 0.50 | 0.10 | 0.35 | 0.14 |
| CS1 A | 99.3 | 0.70 | — | 0.35 | 0.25 |
| CS1 B | 99.7 | — | 0.35 | 0.35 | 0.37 |
| S2 | 97.8 | 2.00 | 0.25 | 1.25 | 0.12 |
| CS2 A | 97.5 | 2.50 | — | 1.25 | 0.15 |
| CS2 B | 98.8 | — | 1.25 | 1.25 | 0.18 |
| S3 | 98.0 | 1.00 | 1.00 | 1.50 | 0.12 |
| CS3 A | 97.0 | 3.00 | — | 1.50 | 0.19 |
| CS3 B | 98.5 | — | 1.50 | 1.50 | 0.20 |
| S4 | 95.9 | 4.00 | 0.10 | 2.10 | 0.14 |
| CS4 A | 95.8 | 4.20 | — | 2.10 | 0.20 |
| CS4 B | 97.9 | — | 2.10 | 2.10 | 0.17 |
| S5 | 95.5 | 4.00 | 0.50 | 2.50 | 0.16 |
| CS5 A | 95.0 | 5.00 | — | 2.50 | 0.20 |
| CS5 B | 97.5 | — | 2.50 | 2.50 | 0.18 |
| S6 | 95.0 | 4.00 | 1.00 | 3.00 | 0.15 |
| CS6 A | 94.0 | 6.00 | — | 3.00 | 0.20 |
| CS6 B | 97.0 | — | 3.00 | 3.00 | 0.16 |

*For clarity, MB50-314 contains only 50 wt % slip agent (i.e., OH-PDMS). Thus, for example, 0.50 wt % of MB50-314 provides a total of 0.25 wt % of OH-PDMS to the total amount of slip agent in the composition.

As seen in Table 1, each of the Samples S1-S6 showed a synergistic effect associated with the combination of erucamide with OH-PDMS when compared to samples containing only erucamide or OH-PDMS when keeping the total amount of slip agent constant. This is because each of the Samples has a lower COF than either of its respective Comparative Samples containing either erucamide or OH-PDMS, which is a surprising and unexpected result.

Example 2

Erucamide and PDMS Slip Agent Synergism in MDPE

Prepare a Sample (S8) and two corresponding Comparative Samples (CS8 A and CS8 B) in the same manner described above in Example 1 except employing a medium-density polyethylene ("MDPE") instead of HDPE. The MDPE employed is available under the product name Dow MDPE DHDA-8864 from The Dow Chemical Company, Midland, Mich., USA. The OH-PDMS and erucamide are the same as described above in Example 1. Analyze S8, CS8 A, and CS8 B for COF according to the procedure provided in the Test Methods section, above. The compositions and COF values of S8, CS8 A, and CS8 B are provided in Table 2, below.

TABLE 2

Compositions and COF of S8, CS8 A, and CS8 B

| Sample No. | MDPE (wt %) | MB50-314 (wt %) | Erucamide (wt %) | Total slip agent (wt %) | COF |
|---|---|---|---|---|---|
| S8 | 97.75 | 2.00 | 0.25 | 1.25 | 0.14 |
| CS8 A | 97.50 | 2.50 | — | 1.25 | 0.15 |
| CS8 B | 98.75 | — | 1.25 | 1.25 | 0.19 |

As with the Samples in Example 1, the combined OH-PDMS and erucamide provided a synergistic lowering of the COF in MDPE when compared to the Comparative Samples containing only OH-PDMS or erucamide as the slip agent.

Example 3

Mineral Oil and PDMS Slip Agent (Comparative)

Prepare a combined slip agent Comparative Sample (CS9) and two corresponding Comparative Samples (CS9 A and CS9 B) in the same manner described above in Example 1, except replace the erucamide with mineral oil. The mineral oil employed in this Example is Univolt N 61B, produced by ExxonMobil Chemical Company, Houston, Tex., USA. Analyze CS9, CS9 A, and CS9 B for COF according to the procedure provided in the Test Methods section, above. The compositions and COF values of CS9, CS9 A, and CS9 B are provided in Table 3, below.

TABLE 3

Compositions and COF of CS9, CS9 A, and CS9 B

| Sample No. | MDPE (wt %) | MB50-314 (wt %) | Mineral Oil (wt %) | Total slip agent (wt %) | COF |
|---|---|---|---|---|---|
| CS9 | 97.75 | 2.00 | 0.25 | 1.25 | 0.18 |
| CS9 A | 97.50 | 2.50 | — | 1.25 | 0.14 |
| CS9 B | 98.75 | — | 1.25 | 1.25 | 0.50 |

As can be seen from the results listed in Table 3, above, while the combined slip agent in CS9 provides a lower COF compared to mineral oil alone (CS9 B), it does not provide a lower COF when compared to OH-PDMS used as the sole slip agent (CS9 A). Thus, the combination of OH-PDMS and mineral oil does not provide a slip agent having a synergistic effect.

Example 4

Epoxidized Soybean Oil and PDMS Slip Agent (Comparative)

Prepare a combined slip agent Comparative Sample (CS10) and two corresponding Comparative Samples (CS10 A and CS10 B) in the same manner described above in Example 1, except replace the erucamide with epoxidized soybean oil ("ESO"). The ESO employed in this Example is obtained from Arkema, Inc. King of Prussia, Pa., USA. Analyze CS10, CS10 A, and CS10 B for COF according to the procedure provided in the Test Methods section, above. The compositions and COF values of CS10, CS10 A, and CS10 B are provided in Table 4, below.

TABLE 4

Compositions and COF of CS10, CS10 A, and CS10 B

| Sample No. | MDPE (wt %) | MB50-314 (wt %) | Mineral Oil (wt %) | Total slip agent (wt %) | COF |
|---|---|---|---|---|---|
| CS10 | 97.75 | 2.00 | 0.25 | 1.25 | 0.14 |
| CS10 A | 97.50 | 2.50 | — | 1.25 | 0.14 |
| CS10 B | 98.75 | — | 1.25 | 1.25 | 0.48 |

As can be seen from the results listed in Table 4, above, while the combined slip agent in CS10 provides a lower COF compared to ESO alone (CS10 B), it does not provide a lower COF when compared to OH-PDMS used as the sole slip agent (CS10 A). Thus, the combination of OH-PDMS and ESO does not provide a slip agent having a synergistic effect.

The invention claimed is:

1. A cable jacket polymeric composition, comprising:
   (a) an ethylene-based polymer; and
   (b) a slip agent,
   wherein said slip agent comprises a silicone and a fatty acid amide,
   wherein said silicone and said fatty acid amide are present in a combined amount ranging from 0.35 to 3.0 weight percent based on the total weight of components (a) and (b),
   wherein said cable jacket polymeric composition has a coefficient of friction lower than both a first comparative composition and a second comparative composition, wherein said first comparative composition has an identical composition as said cable jacket polymeric composition except that said slip agent is comprised entirely of said silicone, wherein said second comparative composition has an identical composition as said cable jacket polymeric composition except that said slip agent is comprised entirely of said fatty acid amide, wherein said coefficient of friction is measured according to ASTM D1894.

2. The cable jacket polymeric composition of claim 1, wherein said silicone is selected from the group consisting of polydimethylsiloxane, poly(methyl-ethylsiloxane), and mixtures thereof, wherein said fatty acid amide is selected from the group consisting of erucamide, oleamide, palmitamide, stearamide, behenamide, and mixtures of two or more thereof.

3. The cable jacket polymeric composition of claim 1, wherein said silicone is hydroxyl-terminated polydimethylsiloxane, wherein said fatty acid amide is erucamide.

4. The cable jacket polymeric composition of claim 1, wherein said silicone and said fatty acid amide are present in a weight ratio ranging from 1:25 to 2:1 fatty acid amide-to-silicone, wherein said silicone is present in an amount ranging from 0.25 to 2.9 weight percent, based on the total weight of components (a) and (b), wherein said fatty acid amide is present in an amount ranging from 0.1 to 1.5 weight percent, based on the total weight of components (a) and (b).

5. The cable jacket polymeric composition of claim 1, wherein said cable jacket polymeric composition has a coefficient of friction of less than 0.15 as measured according to ASTM D1894.

6. The cable jacket polymeric composition of claim 1, wherein said ethylene-based polymer is a high-density polyethylene.

7. The cable jacket polymeric composition of claim 1, wherein said slip agent consists of said silicone and said fatty acid amide.

8. The cable jacket polymeric composition of claim 1, wherein said silicone and said fatty acid amide are present in a combined amount ranging from 0.5 to 2.5 weight percent based on the total weight of components (a) and (b), wherein said silicone and said fatty acid amide are present in a weight ratio ranging from 1:20 to 2:3 fatty acid amide-to-silicone.

9. An article of manufacture comprising:
   (a) a conductor; and
   (b) a coating at least partially surrounding said conductor, wherein said cable jacket polymeric composition of claim 1 constitutes at least a portion of said coating.

* * * * *